United States Patent [19]
Kazmierzak

[11] Patent Number: 5,622,001
[45] Date of Patent: Apr. 22, 1997

[54] SLUG AND SNAIL TRAP

[76] Inventor: Michael L. Kazmierzak, 23405 Ardmore Trail, South Bend, Ind. 46628

[21] Appl. No.: 482,444

[22] Filed: Jun. 7, 1995

[51] Int. Cl.⁶ .................................................. A01M 1/10
[52] U.S. Cl. ................. 43/121; 43/122; 43/131; 43/107
[58] Field of Search ............... 43/107, 122, 121, 43/131

[56] References Cited

U.S. PATENT DOCUMENTS

| | | | |
|---|---|---|---|
| 1,091,550 | 3/1914 | Walters | 43/122 |
| 1,577,351 | 3/1926 | Alvarez | 43/131 |
| 3,108,391 | 10/1963 | Sipos | 43/131 |
| 3,772,820 | 11/1973 | Bond | 43/131 |
| 4,035,946 | 7/1977 | Rapp | 43/131 |
| 4,179,840 | 12/1979 | Sandefur | 43/131 |
| 4,277,907 | 7/1981 | Ernest | 43/131 |
| 5,152,097 | 10/1992 | Rhodes | 43/131 |
| 5,231,792 | 8/1993 | Warner | 43/122 |

FOREIGN PATENT DOCUMENTS

| | | | |
|---|---|---|---|
| 0388349 | 9/1990 | European Pat. Off. | 43/131 |
| 0342782 | 1/1960 | Switzerland | 43/131 |
| 0708226 | 4/1954 | United Kingdom | 43/131 |

*Primary Examiner*—Kurt Rowan
*Attorney, Agent, or Firm*—Baker & Daniels

[57] ABSTRACT

A device for trapping and collecting snails, slugs, and other like creatures in a garden environment. The device includes a container having a primary opening for accessing the interior of the container and entrance ports to provide a path of ingress for the animals to be caught. The device further includes a skirt that surrounds the container to provide the dark environment preferred by such creatures and an anchor means to secure the device from tampering by raccoons, squirrels, and other rodents.

5 Claims, 3 Drawing Sheets

SLUG AND SNAIL TRAP

BACKGROUND AND SUMMARY OF THE INVENTION

The present invention relates generally to a trap for snails, slugs, and other similar creatures in a garden environment.

Gardeners and horticulturists frequently experience problems with an overabundance of slugs, snails, and other similar creatures. Despite their small size, such animals can significantly damage flowers, vegetables, fruits and other crops. Therefore, gardeners need a convenient and inexpensive way to eliminate or at least reduce the numbers of slugs and snails in a garden.

Traps for snails or slugs are generally well known in the art. For example, U.S. Pat. No. 4,747,230 discloses a slug trap having a ramp surface for the ingress of slugs, while U.S. Pat. No. 4,761,912 discloses a snail trap having a concealed poison chamber. Still other devices utilize a variety of means to trap and/or kill slugs and snails.

Ideally, a snail trap should not only be capable of attracting the animals, but it should also be able to contain the animals. Therefore, such a trap should provide a ready avenue of ingress, while minimizing the chances for escape. Also, because some people prefer the more humane means of relocation rather than extermination, such a trap should function well with or without poison. Many of the prior art devices require the use of poison in order to operate effectively.

The trap made according to the present invention functions well with or without the use of poison, and leaves the question of ultimate disposal up to the user. The device provides an easy and attractive entrance path for slugs and snails, while making escape almost impossible. For example, one embodiment of the present invention provides an opaque shroud or skirt which provides the dark environment preferred by slugs and snails, and which also eliminates dilution or spoilage of the bait caused by water or sunlight. Further, the entrance ports are easy to find on the way in, but less easy to find on the way out. Because it is difficult for the slugs to simply turn around and leave, the user need not resort to poison in order to accomplish the desired effect.

Finally, because trap devices are exposed to the wind as well as to curious animals, such as squirrels or raccoons, the present invention incorporates an anchor device which prevents the device from being overturned or otherwise tampered with by squirrels or raccoons.

Accordingly, it is an object of this invention to provide a slug or snail trap that provides an easy avenue of ingress for the animals to be captured.

It is another object of this invention to provide a trap that renders egress extremely difficult.

A still further object of this invention is to provide a trap that functions well with or without poison.

Another object of this invention os to provide a trap that is resistant to rodents and other small animals.

Other objects of the invention will become readily apparent to those skilled in the art upon a reading of the following description.

BRIEF DESCRIPTION OF THE DRAWINGS

A preferred embodiment of the invention has been depicted for purposes of illustration wherein.

DESCRIPTION OF THE PREFERRED EMBODIMENT

Figure 1:
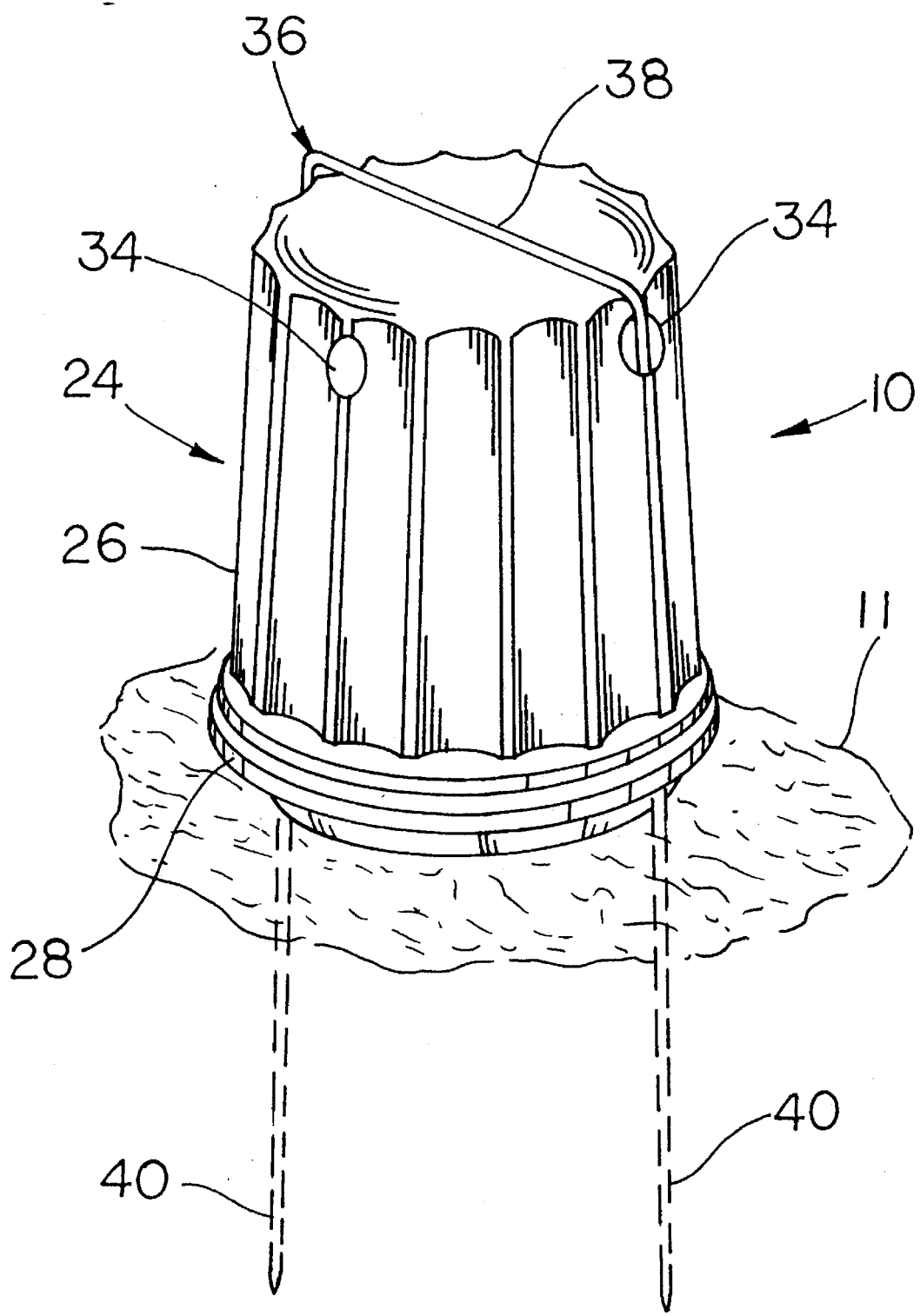
FIG. 1 is a perspective view of a slug and snail trap device.
Figure 2:
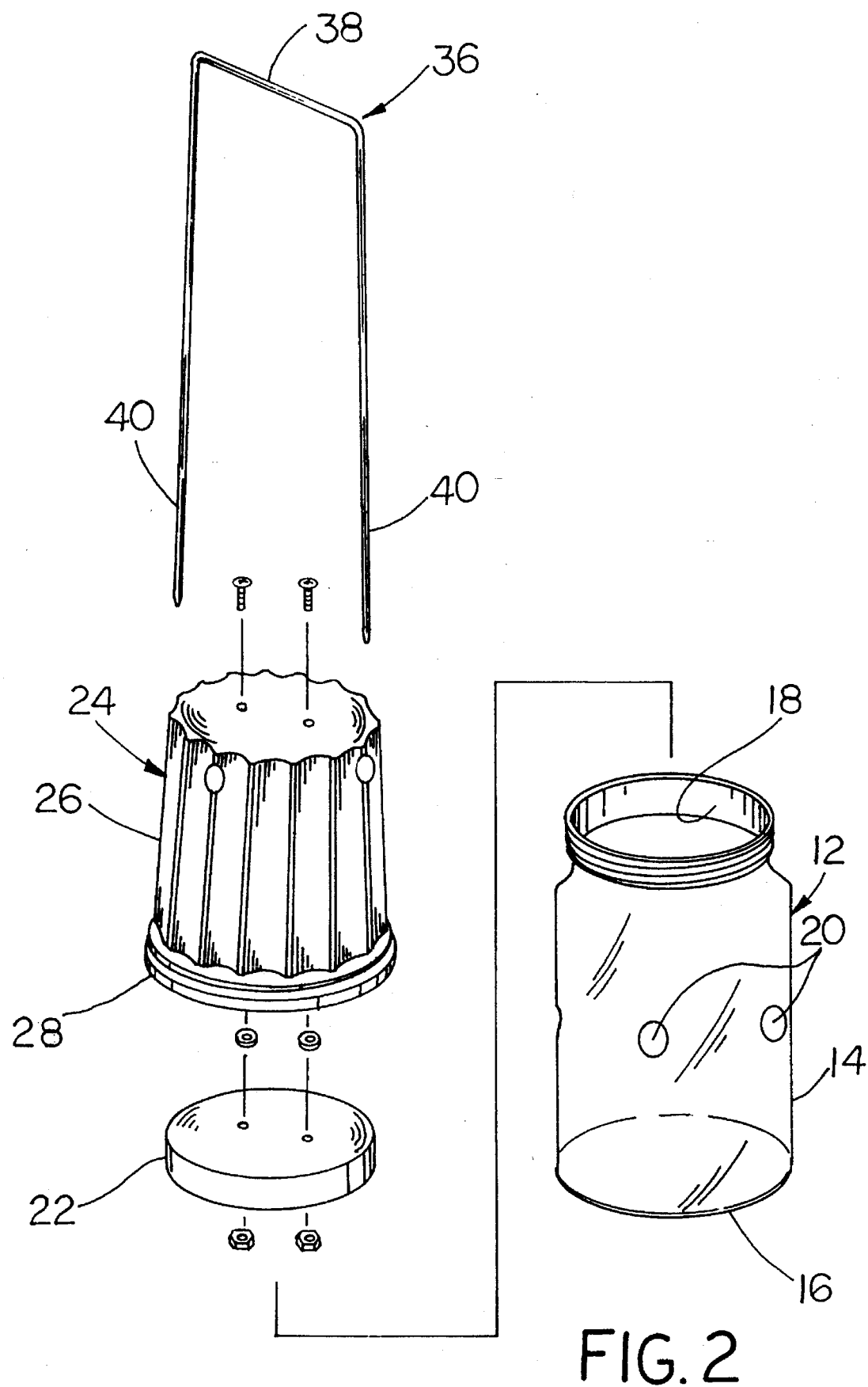
FIG. 2 is an exploded view in perspective of the slug and snail trap device illustrated in FIG. 1.
Figure 3:
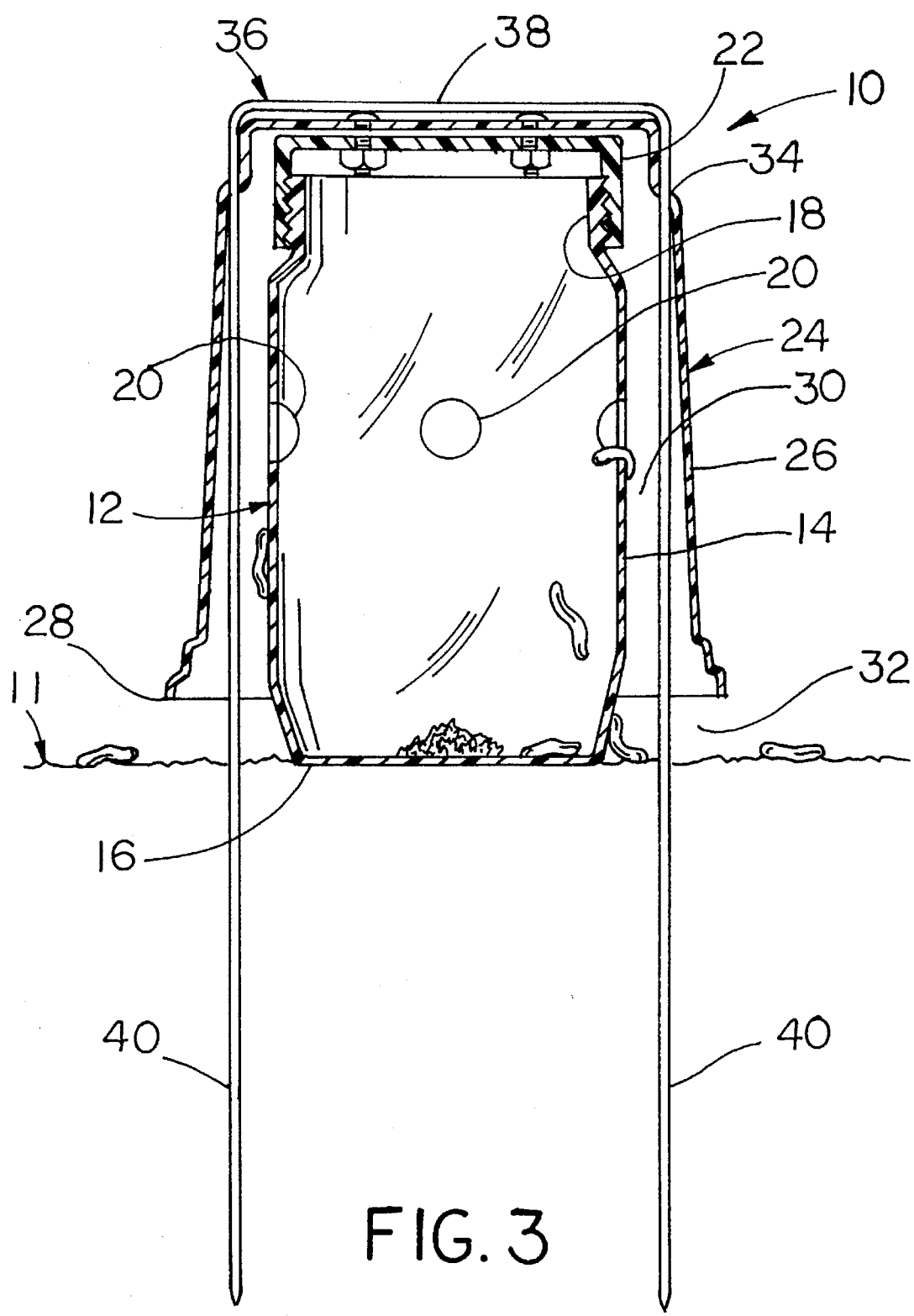
FIG. 3 is a cross-sectional view of the slug and snail trap device illustrated in FIGS. 1 and 2, showing the device anchored to the ground.

The preferred embodiment herein described is not intended to be exhaustive or to limit the invention to the precise form disclosed. It is chosen and described to explain the principles of the invention and its application and practical use to best enable others skilled in the art to follow its teachings.

Referring now to the drawings, a trap for slugs or snails is generally indicated by the reference numeral 10 and is placed on a support surface 11 (such as the ground). The trap 10 according to the present invention includes a container 12 having an outer wall 14 and a base 16. Container 12 includes a primary opening 18 and a plurality of ports 20 disposed on outer wall 14. Removable cover 22 covers primary opening 18 of container 12 and is secured by threads or similar conventional means that facilitate periodic disengagement.

Skirt member 24 is attached to removable cover 22 by fasteners or other conventional means. Skirt member 24 includes downwardly extending shroud part 26 which terminates in a lower edge 28. Shroud part 26 includes engagement holes 34. Shroud part 26 of skirt member 24 and outer wall 14 of container 12 define a chamber 30 therebetween. Lower edge 28 of skirt 24 defines a gap 32 between lower edge 28 and support surface 11.

Anchor member 36 is formed from steel or other suitable rigid material. Anchor member 36 includes a center portion 38 and a pair of prongs 40 for engagement with engagement holes 34 and for insertion into the support surface 11.

In operation, bait is placed in container 12 through primary opening 18. Removable cover 22 having skirt member 24 attached is threaded over primary opening 18. Trap 10 is then placed on support surface 11 and anchor member 36 is used to secure the trap to the ground. Prongs 40 of anchor 36 are inserted through engagement holes 34, through chamber 30 and into the support surface 11. Center portion 38 abuts skirt member 24 thus preventing any movement.

Slugs or snails attracted by the bait within container 12 crawl along the support surface 11 and through gap 32 under lower edge 28 of shroud part 26. When the creatures contact outer wall 14 of container 12 they ascend through chamber 30 by climbing outer wall 14 drawn by the bait within. The scent permeating through ports 20 enables the creatures to locate the ports, through which they enter the container and climb down within seeking the bait. Attempts to escape are frustrated by the fact that the surface area of ports 22 represent only a small fraction of the overall surface area of outer wall 14. With no scent to assist them the animals cannot locate the ports from within the container 12.

It is understood that the above description does not limit the invention to the above-given details, but may be modified within the scope of the following claims.

I claim:

1. A trap for slugs, snails, and other creatures comprising:
    a container for receiving and collecting slugs and snails and further for holding bait for attracting slugs and snails, said container including an outer wall, a base for placement on a support surface, a primary opening for allowing access to the interior of said container, and a plurality of ports in said outer wall;

a removable cover for covering said primary opening;

a skirt attached to said removable cover and extending outward and downward towards said base and covering said outer wall and said ports of said container but defining a chamber therebetween, said skin terminating in a lower edge, said lower edge of said skin cooperating with said base to define a gap therebetween; and anchor means for anchoring said trap to the support surface and to prevent said trap from being overturned, said anchor means including an inverted U-shaped member, said inverted U-shaped member having a pair of prongs for insertion into the support surface and a center portion connecting said prongs for abutting said skirt, said skin including engagement means, wherein said center portion of said U-shaped member is disposed over said removable cover and said prongs coact with said engagement means and the support surface, whereby the bait in said container attracts creatures to enter through said gap, crawl upwardly along said outer wall through said chamber and then enter the container through said ports.

2. A trap as claimed in claim 1, wherein said ports are positioned in said container at a transverse section displaced from said base.

3. A trap as claimed in claim 2, wherein said skirt is formed from an opaque material.

4. A trap as claimed in claim 3, wherein said container is formed of a translucent material.

5. A trap as claimed in claim 1, wherein said container is generally cylindrical in shape.

\* \* \* \* \*